United States Patent
Choi et al.

(10) Patent No.: US 12,523,696 B2
(45) Date of Patent: Jan. 13, 2026

(54) MEASURING APPARATUS FOR SEMICONDUCTOR DEVICE AND MEASURING METHOD USING THE SAME

(71) Applicant: Samsung Electronics Co., Ltd., Suwon-si (KR)

(72) Inventors: Jinhyuk Choi, Suwon-si (KR); Sumin Park, Suwon-si (KR); Myungki Song, Suwon-si (KR); Kongwoo Lee, Suwon-si (KR); Kyusang Lee, Suwon-si (KR); Beomsoo Hwang, Suwon-si (KR); Jayul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 18/591,091

(22) Filed: Feb. 29, 2024

(65) Prior Publication Data

US 2024/0353484 A1 Oct. 24, 2024

(30) Foreign Application Priority Data

Apr. 18, 2023 (KR) .................. 10-2023-0050652

(51) Int. Cl.
*G01R 31/28* (2006.01)

(52) U.S. Cl.
CPC ..... *G01R 31/2891* (2013.01); *G01R 31/2893* (2013.01)

(58) Field of Classification Search
CPC G01R 31/26; G01R 31/2642; G01R 31/2648; G01R 31/2831; G01R 31/31702
See application file for complete search history.

(56) References Cited

U.S. PATENT DOCUMENTS

| 7,166,184 B2 | 1/2007 | Nakamura et al. |
| 8,113,142 B2 | 2/2012 | Oh |

(Continued)

FOREIGN PATENT DOCUMENTS

| JP | 2012099658 A | 5/2012 |
| JP | 2012156304 A | 8/2012 |

(Continued)

*Primary Examiner* — Tung X Nguyen
(74) *Attorney, Agent, or Firm* — Wolf, Greenfield & Sacks, P.C.

(57) ABSTRACT

A measuring apparatus for a semiconductor device includes a lower frame that provides a lower measurement space configured for performing a first measurement process, a lower measuring portion in the lower frame and configured to measure the first semiconductor substrate on a lower substrate stage, a lower vibration damping portion configured to offset a first vibration of the lower measuring portion with respect to a ground, an upper frame that provides an upper measurement space configured for performing a second measurement process, an upper measuring portion in the upper frame to measure a second semiconductor substrate=on an upper substrate stage, an upper vibration damping portion configured to offset a second vibration of the upper measuring portion with respect to the ground, and a plurality of support structures that support the upper frame such that the upper frame is spaced apart from the lower frame.

20 Claims, 4 Drawing Sheets

(56) References Cited

U.S. PATENT DOCUMENTS

| | | |
|---|---|---|
| 8,534,936 B2 | 9/2013 | Enokida et al. |
| 2012/0064460 A1 | 3/2012 | Aoki |
| 2016/0075549 A1* | 3/2016 | Aoki ..................... B81B 3/0086 |
| | | 257/417 |
| 2022/0166379 A1* | 5/2022 | Itomi ..................... H03B 5/323 |

FOREIGN PATENT DOCUMENTS

| | | |
|---|---|---|
| KR | 100897850 B1 | 5/2009 |
| KR | 101070576 B1 | 10/2011 |
| KR | 101147658 B1 | 5/2012 |
| KR | 102129774 B1 | 7/2020 |
| KR | 102216234 B1 | 2/2021 |

\* cited by examiner

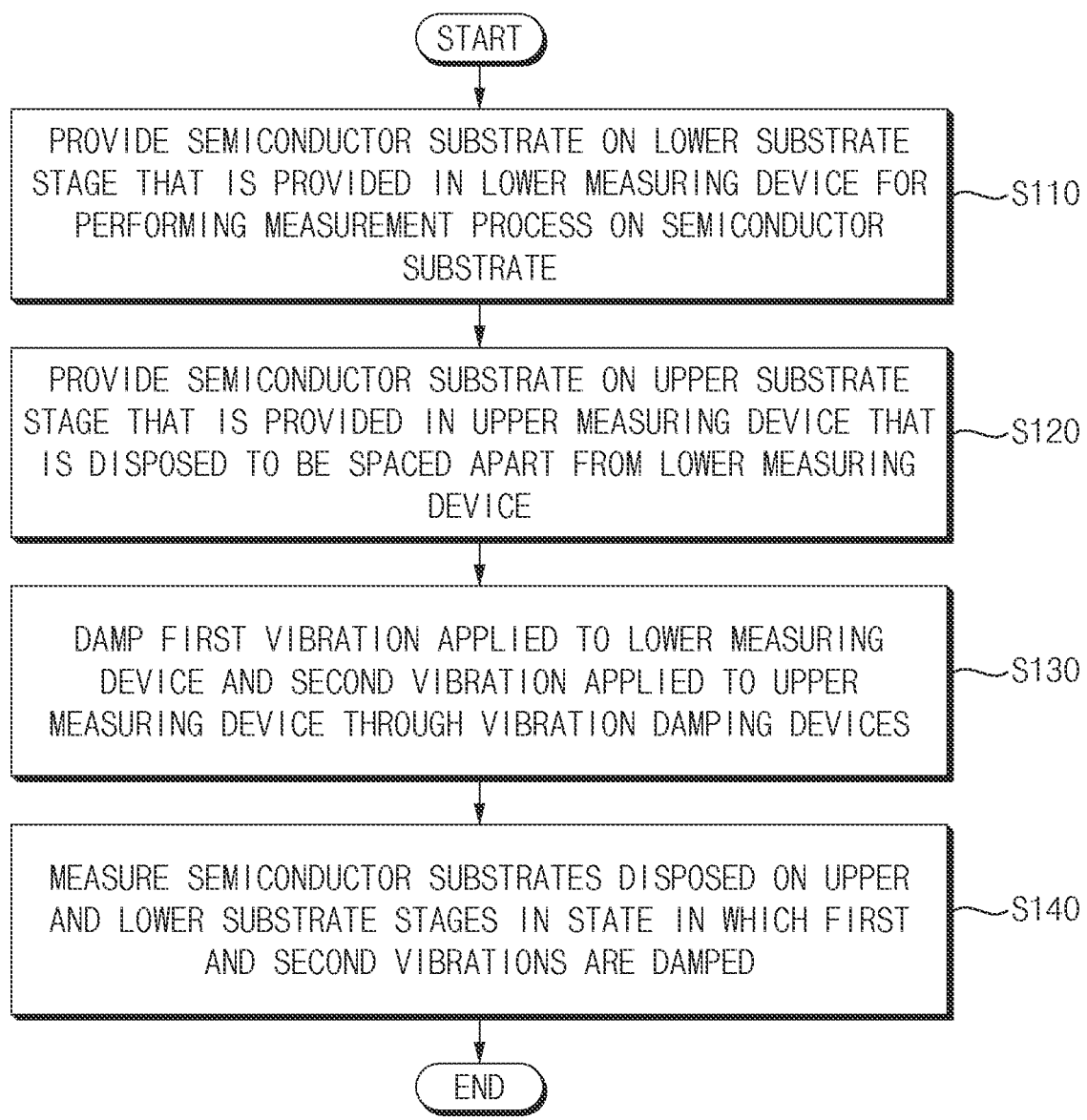

MEASURING APPARATUS FOR SEMICONDUCTOR DEVICE AND MEASURING METHOD USING THE SAME

PRIORITY STATEMENT

This application claims priority under 35 U.S.C. § 119 to Korean Patent Application No. 10-2023-0050652, filed on Apr. 18, 2023, in the Korean Intellectual Property Office (KIPO), the contents of which are herein incorporated by reference in their entirety.

FIELD

Example embodiments relate to a measuring apparatus for a semiconductor device and a method of measuring a semiconductor device using the same. More particularly, example embodiments relate to a measuring apparatus for a semiconductor device having a plurality of measuring devices stacked on each other and a method of measuring a semiconductor device using the same.

BACKGROUND

In manufacturing a semiconductor device, semiconductor measuring device capable of precision control may be used. The semiconductor measuring device capable of precision control may have a complex structure, and thus may require a wide installation space. In order to utilize the installation space, semiconductor measuring devices may be stacked on each other. Vibrations may be transmitted between semiconductor measuring devices stacked on each other, and the vibrations may affect the precision control. When semiconductor measuring devices are simply stacked on each other, vibrations of the semiconductor measuring devices may be increased due to an interaction that occurs between damping devices for canceling vibrations of the semiconductor measuring devices.

SUMMARY

Example embodiments provide a measuring apparatus for a semiconductor device that is configured to damp vibrations generated in stacked semiconductor measuring devices.

Example embodiments provide a method of measuring a semiconductor device using the measuring apparatus.

According to example embodiments, a measuring apparatus for a semiconductor device includes a lower frame that provides a lower measurement space configured for performing a first measurement process on a first semiconductor substrate, a lower measuring portion in the lower frame and configured to measure a characteristic of the first semiconductor substrate on a lower substrate stage, a lower vibration damping portion configured to offset a first vibration of the lower measuring portion with respect to a ground, an upper frame that provides an upper measurement space configured for performing a second measurement process on a second semiconductor substrate, an upper measuring portion in the upper frame and configured to measure a characteristic of the second semiconductor substrate on an upper substrate stage, an upper vibration damping portion configured to offset a second vibration of the upper measuring portion with respect to the ground, and a plurality of support structures that support the upper frame such that the upper frame is spaced apart from the lower frame.

According to example embodiments, a measuring apparatus for a semiconductor device includes a lower measuring device including a lower frame providing a lower measurement space configured for performing a first measurement process on a first semiconductor substrate, a lower measuring portion in the lower frame and configured to measure a characteristic of the first semiconductor substrate on a lower substrate stage, and a lower vibration damping portion configured to offset a first vibration of the lower measuring portion with respect to a ground, an upper measuring device including an upper frame providing an upper measurement space configured for performing a second measurement process on a second semiconductor substrate, an upper measuring portion in the upper frame and configured to measure a characteristic of the second semiconductor substrate on an upper substrate stage, and an upper vibration damping portion configured to offset a second vibration of the upper measuring portion with respect to the ground, and a plurality of support structures that support the upper measuring device such that the upper measuring device is spaced apart from the lower measuring device.

According to example embodiments, in a method of measuring a semiconductor device, a first semiconductor substrate is provided on a lower substrate stage of a lower measuring device for performing a first measurement process. A second semiconductor substrate is provided on an upper substrate stage of an upper measuring device for performing a second measurement process and is spaced apart from the lower measuring device. A first vibration applied to the lower measuring device and a second vibration applied to the upper measuring device are damped through lower and upper vibration damping devices, respectively. One or more characteristics of the first and second semiconductor substrates on the upper and lower substrate stages are measured in a state in which the first and second vibrations are damped, respectively.

Thus, the lower vibration damping portion may offset the first vibration generated from the ground to the lower measuring portion. The upper vibration damping portion may offset the second vibration generated from the ground to the upper measuring portion. Since the lower and upper vibration damping portions may independently offset the first and second vibrations, respectively, the lower and upper vibration damping portions might not affect each other in a process of damping the first and second vibrations, respectively.

Also, unlike the lower frame, the upper frame may be disposed on the ground through the plurality of support structures. The plurality of support structures may support the upper frame to be spaced apart from the lower frame. Since the lower and upper frames are disposed to be spaced apart from each other, vibrations might not be transmitted between the upper frame and the lower frame, and the lower vibration damping portion and the upper vibration damping portion may independently offset the first and second vibrations.

The measuring apparatus may improve space utilization through the plurality of support structures, and accuracy of the measurement process may be improved through the upper and lower vibration damping portions that independently control or compensate for the first and second vibrations.

BRIEF DESCRIPTION OF THE DRAWINGS

Example embodiments will be more clearly understood from the following detailed description taken in conjunction with the accompanying drawings. FIGS. 1 to 4 represent non-limiting, example embodiments as described herein.

FIG. 1 is a perspective view illustrating a measuring apparatus for a semiconductor device in accordance with example embodiments.

FIG. 2 is a view illustrating the measuring apparatus in FIG. 1.

FIG. 3 is a view illustrating a measuring apparatus for a semiconductor device having a modified structure in accordance with example embodiments.

FIG. 4 is a flowchart illustrating a method of measuring a semiconductor device in accordance with example embodiments.

DETAILED DESCRIPTION OF EXAMPLE EMBODIMENTS

Hereinafter, example embodiments will be explained in detail with reference to the accompanying drawings. The terms "comprises," "comprising," "includes" and/or "including," when used herein, specify the presence of stated elements, but do not preclude the presence of additional elements. The term "and/or" includes any and all combinations of one or more of the associated listed items. As used herein, when components or layers are referred to as "directly on" or "directly connected" or "directly coupled", no intervening components or layers are present. It will be understood that spatially relative terms such "above," "upper," "below," "lower," and the like may be described relative to a reference point (e.g., the ground), but are intended to encompass different orientations of the device in use or operation in addition to the orientation depicted in the figures. For example, if the device in the figures is turned over, elements described as "below" or "beneath" other elements or features would then be oriented "above" the other elements or features.

Figure 1:
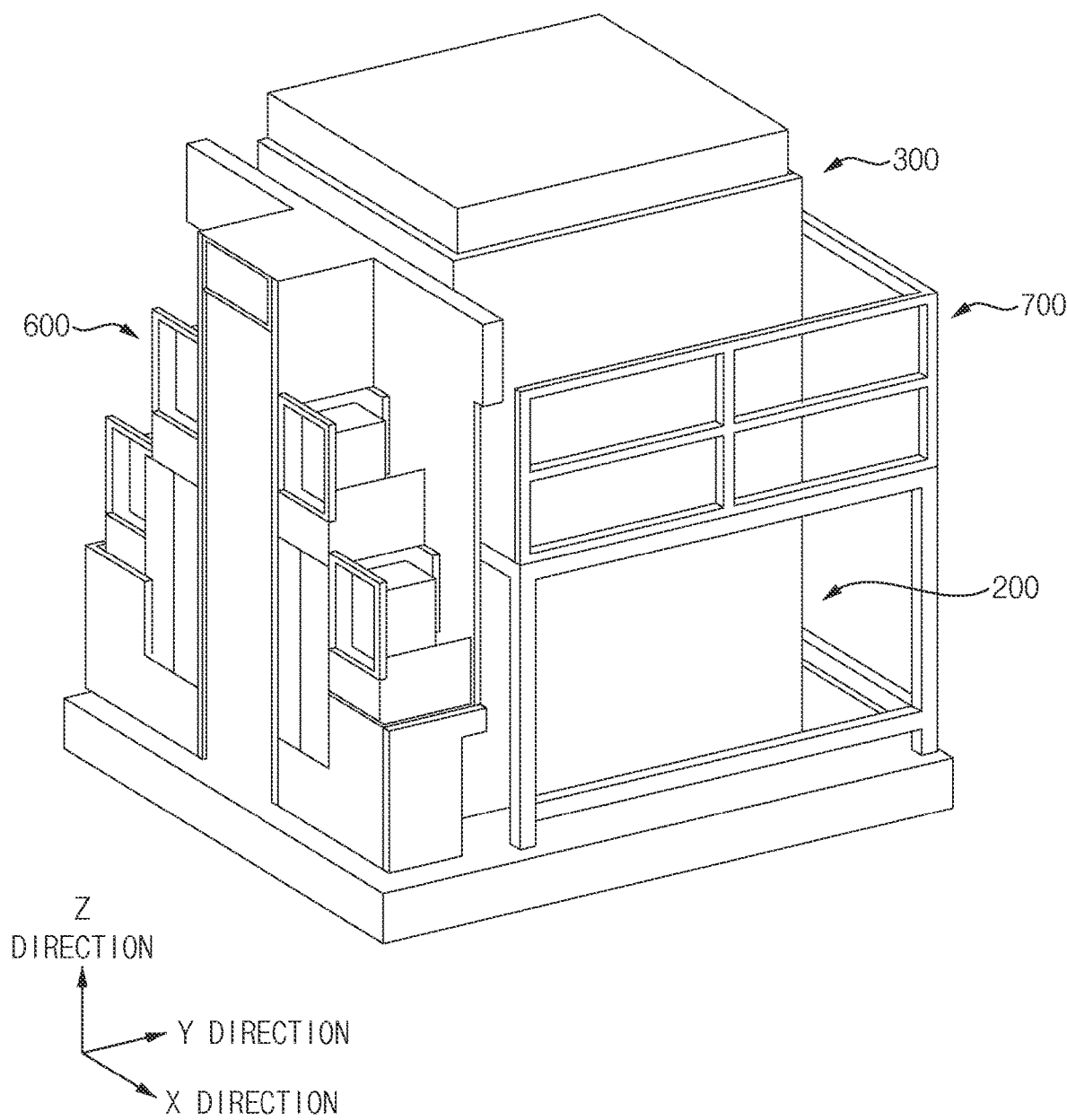
Figure 2:
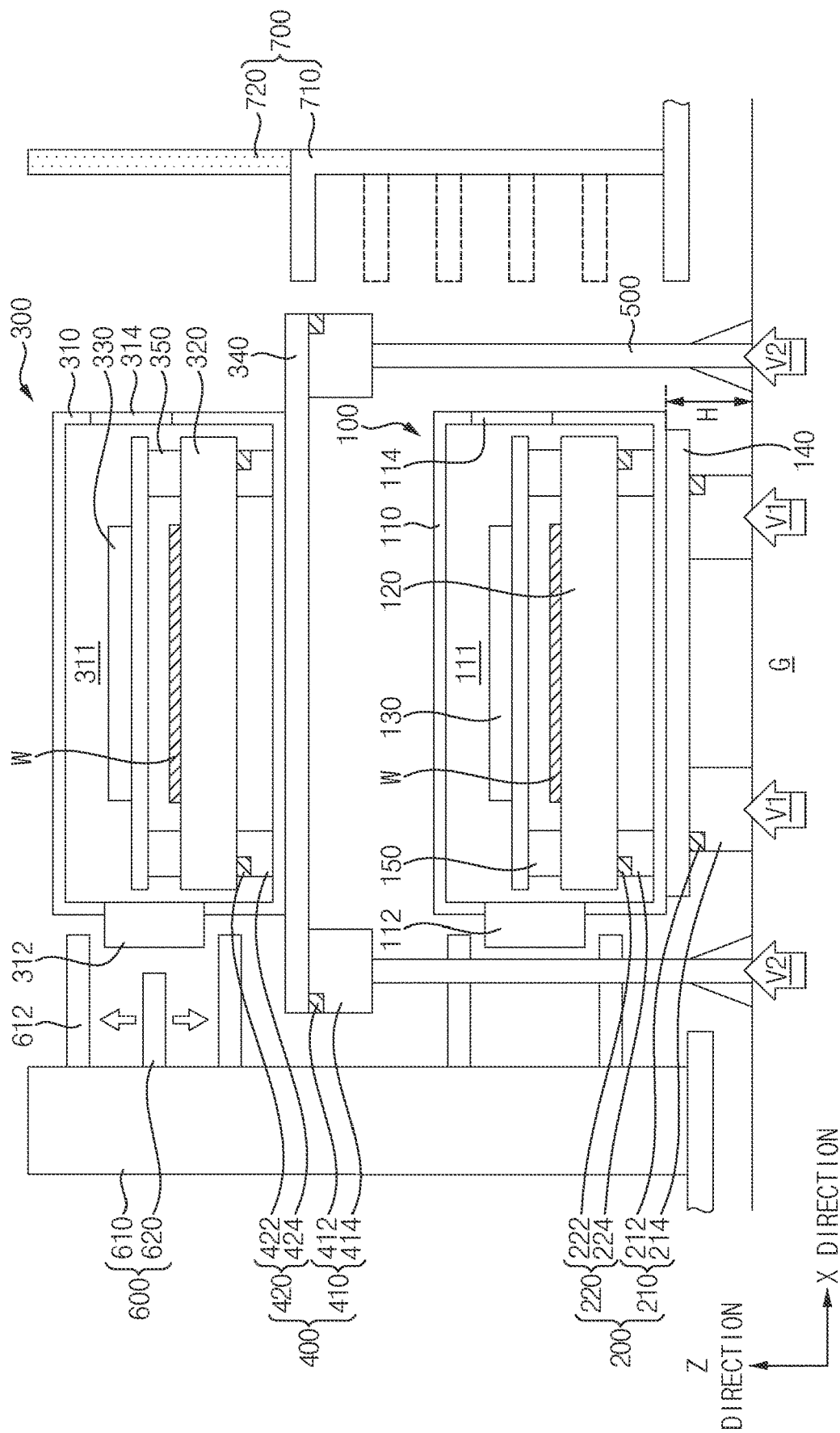

FIG. 1 is a perspective view illustrating a measuring apparatus for a semiconductor device in accordance with example embodiments. FIG. 2 is a view illustrating the measuring apparatus in FIG. 1.

Referring to FIGS. 1 and 2, a measuring apparatus 10 for a semiconductor device may include a lower measuring device 100 configured to perform a measurement process on a semiconductor substrate W, an upper measuring device 300 provided to be spaced apart from the lower measuring device 100 to perform the measurement process, and a plurality of support structures 500 configured to support the upper measuring device 300 to be spaced apart from the lower measuring device 100.

In example embodiments, the measuring apparatus 10 may be used to measure or manufacture the semiconductor device such as the semiconductor substrate. The measuring apparatus 10 may measure circuit patterns formed on the semiconductor substrate W. The measuring apparatus 10 may form an uncured resin on the semiconductor substrate W and form a pattern on the uncured resin.

In example embodiments, the lower measuring device 100 may be disposed on a ground G in a semiconductor manufacturing facility for manufacturing the semiconductor device. For example, the ground G may include concrete.

The lower measuring device 100 may include a lower frame 110 that provides a lower measurement space 111 for performing the measurement process, a lower substrate stage 120 provided in the lower frame 110 to support the semiconductor substrate W, a lower measuring portion 130 configured to measure the semiconductor substrate W (e.g., including one or more characteristics thereof) disposed on the lower substrate stage 120, and a lower vibration damping portion 200 configured to damp a first vibration V1 of the lower measuring portion 130 with respect to the ground G. The terms "first," "second," etc., may be used herein merely to distinguish one component, layer, direction, etc. from another.

In example embodiments, the lower frame 110 may provide an enclosed space that is configured to perform the measurement process on the semiconductor substrate W.

The lower substrate stage 120 may be provided within the lower frame 110 to support the semiconductor substrate. For example, the lower substrate stage 120 may serve as a susceptor capable of supporting the semiconductor substrate.

The lower substrate stage 120 may include a plurality of lower mounting pins and a lower edge holder. The lower substrate stage 120 may support a lower surface of the semiconductor substrate W through the plurality of lower mounting pins. The lower substrate stage 120 may support a side surface of the semiconductor substrate W through the lower edge holder. The lower substrate stage 120 may include a jig plate that indicates an area where the semiconductor substrate W is to be disposed. The plurality of lower mounting pins may be provided to be spaced apart from each other on the jig plate.

A lower gate or door 112 capable of being opened for entering and exiting the semiconductor substrate W may be provided on a sidewall of the lower frame 110. The semiconductor substrate W may be loaded into and unloaded from the lower measurement space 111 through the lower gate 112. The semiconductor substrate W may be loaded and disposed on the lower substrate stage 120 through the lower gate 112.

The lower frame 110 may include a lower viewing window 114. The lower viewing window 114 may be provided in the sidewall of the lower frame 110. The lower viewing window 114 may transmit light such that the lower measurement space 111 is observable from the outside, that is, from external to the measuring apparatus 10. That is, the lower viewing window 114 may be referred to as a viewing mechanism for the isolated lower frame 110, and may include a material such as glass, quartz, fused silica, or sapphire.

The lower frame 110 may include a bellows cover to reduce or minimize vibration applied from the outside. The bellows cover may damp the vibration applied from the outside through wrinkles or folds that are compressed or stretched. For example, the lower frame 110 may have the bellows cover on the lower gate 112 through which the semiconductor substrate W is loaded and unloaded.

The lower frame 110 may include metallic or ceramic materials. For example, the metallic or ceramic materials may include at least one of metals, metal oxides, metal nitrides, metal oxynitrides, or any combination thereof. The lower frame 110 may include aluminum, aluminum oxide, aluminum nitride, aluminum oxynitride, or any combination thereof.

In example embodiments, the lower measuring portion 130 may be provided in the lower measurement space 111 of the lower frame 110. The lower measuring portion 130 may perform the measurement process on the semiconductor substrate W that is disposed on the lower substrate stage 120 (also referred to herein as a first semiconductor substrate W). The lower measuring portion 130 may perform the measurement process through precision control of nanometer level, that is, precise control at down to the nanometer range. Since the lower measuring portion 130 performs such high-precision control, the lower measuring portion 130 may be vulnerable to the vibration from the outside.

The lower measuring portion 130 may be disposed on the lower substrate stage 120 by a plurality of lower supports 150. The plurality of lower supports 150 may be provided on the lower substrate stage 120 to support the lower measuring portion 130 so as to be spaced apart from the lower substrate stage 120. Alternatively, the plurality of lower supports 150 may be provided in various positions within the lower frame 110 to offset the vibration.

In example embodiments, the lower vibration damping portion 200 may offset (e.g., counteract) the first vibration V1 applied to the lower measuring device 100. The lower vibration damping portion 200 may offset the first vibration V1 applied to the lower frame 110 from the ground G. The lower vibration damping portion 200 may offset the first vibration V1 applied to the lower measuring portion 130 from the lower frame 110.

The lower vibration damping portion 200 may include a plurality of first serial type dampers 210 and a plurality of first parallel type dampers 220. The first serial type dampers 210 and the first parallel type dampers 220 may offset a vibration in a horizontal direction (X direction) and a vibration in a vertical direction (Z direction) of the first vibration V1 applied to the lower measuring device 100.

The first serial type dampers 210 may be provided between the lower frame 110 and the ground G. The first serial type dampers 210 may be provided on a base plate of the lower frame 110 and may extend toward the ground G. The first serial type dampers 210 may support the lower frame 110 on the base plate of the lower frame 110. For example, the first serial type dampers 210 may be provided in corner regions of the lower frame 110, respectively.

The first serial type dampers 210 may be fixed on or may be attached to the ground G, and the first serial type dampers 210 may oppositely move the lower frame 110 based on an error caused by the first vibration V1 to offset the first vibration V1. That is, the first serial type dampers 210 may be configured to counteract or offset motion caused by the first vibration V1. The first serial type dampers 210 may sense and offset the first vibration V1 in real time.

The first serial type dampers 210 may include first serial type vibration sensors 212 that are configured to detect a vibration in the vertical direction (Z direction) and a vibration in the horizontal direction (X direction) of the first vibration V1, and first serial type actuators 214 that are configured to offset the vibration in the vertical direction (Z direction) and the vibration in the horizontal direction (X direction) of the first vibration V1. The first serial type vibration sensors 212 may obtain vibration data of the first vibration V1 on the base plate of the lower frame 110, respectively. The first serial type actuators 214 may actuate to level or horizontally maintain (i.e., maintain a horizontal orientation of) the base plate of the lower frame 110 based on the vibration data of the first vibration V1 to offset the first vibration V1.

The first parallel type dampers 220 may be provided in the lower measurement space 111 of the lower frame 110. The first parallel type dampers 220 may be provided between the lower frame 110 and the lower substrate stage 120. The first parallel type dampers 220 may be provided on the base plate of the lower frame 110 and may extend toward the lower substrate stage 120. The first parallel type dampers 220 may support the lower substrate stage 120 on the base plate of the lower frame 110. For example, the first parallel type dampers 220 may be provided in corner regions of the lower substrate stage 120, respectively.

The first parallel type dampers 220 may control a center of gravity of the lower measuring device 100 that is changed by the first vibration V1. The first parallel type dampers 220 may oppositely move the center of gravity of the lower measuring device 100 based on an error caused by the first vibration V1 to offset the first vibration V1. That is, the first parallel type dampers 220 may be configured to counteract or offset changes in the center of gravity caused by the first vibration V1. The first parallel type dampers 220 may sense and offset the first vibration V1 in real time.

The first parallel type dampers 220 may include first parallel type vibration sensors 222 that are configured to detect a vibration in the vertical direction (Z direction) and a vibration in the horizontal direction (X direction) of the first vibration V1, and first parallel type actuators 224 that are configured to offset the vibration in the vertical direction (Z direction) and the vibration in the horizontal direction (X direction) of the first vibration V1. The first parallel type vibration sensors 222 may obtain the vibration data of the first vibration V1 on the base plate of the lower frame 110, respectively. The first parallel type actuators 224 may actuate to horizontally maintain the lower substrate stage 120 based on the vibration data of the first vibration V1 to offset the first vibration V1.

The lower frame 110 may be spaced apart from the ground G by a predetermined height H through the first serial type dampers 210. Since the lower frame 110 is spaced apart from the ground G by the predetermined height H, the first vibration V1 directly transmitted from the ground G may be blocked. For example, the predetermined height H may be within a range of 0.7 m to 1 m.

In example embodiments, the lower measuring device 100 may further include a lower plate 140 that is configured to support the lower frame 110. The lower plate 140 may more stably support the lower frame 110. The lower plate 140 may be provided between the first serial type dampers 210 and the lower frame 110.

The lower plate 140 may widen a disposition region on which the first serial type dampers 210 are provided. The first serial type dampers 210 may be provided on the lower plate 140, and may be provided outside of the base plate of the lower frame 110. Since the disposition region of the first serial type dampers 210 is widened through the lower plate 140, the first serial type dampers 210 may more stably support the lower frame 110.

In example embodiments, the upper measuring device 300 may be disposed on the plurality of support structures 500 that are installed in the semiconductor manufacturing facility. The plurality of support structures 500 may be provided fixedly on or attached to the ground G.

The upper measuring device 300 may include an upper frame 310 that provides an upper measurement space 311 for performing a measurement process, an upper substrate stage 320 provided in the upper frame 310 to support the semiconductor substrate W (also referred to herein as a second semiconductor substrate W), an upper measuring portion 330 configured to measure the semiconductor substrate W (e.g., including one or more characteristics thereof) disposed on the upper substrate stage 320, and an upper vibration damping portion 400 configured to damp a second vibration V2 of the upper measuring portion 330 with respect to the ground G.

In example embodiments, the upper frame 310 may provide an enclosed space that is configured to perform the measurement process on the semiconductor substrate W. A base plate of the upper frame 310 may be provided fixedly on or attached to the plurality of support structures 500. The upper frame 310 may be provided on the lower measuring device 100 through the plurality of support structures 500.

The upper substrate stage 320 may be provided within the upper frame 310 to support the semiconductor substrate. For example, the upper substrate stage 320 may serve as a susceptor for supporting the semiconductor substrate. The upper substrate stage 320 may include a plurality of upper mounting pins and an upper edge holder that have the same functions as the plurality of lower mounting pins and the lower edge holders of the lower substrate stage 120.

An upper gate or door 312 capable of being opened for entering and exiting the semiconductor substrate W may be provided on a sidewall of the upper frame 310. The semiconductor substrate W may be loaded into and unloaded from the upper measurement space 311 through the upper gate 312. The semiconductor substrate W may be loaded and disposed on the upper substrate stage 320 through the upper gate 312.

The upper frame 310 may include an upper viewing window 314. The upper viewing window 314 may be provided in the sidewall of the upper frame 310. The upper viewing window 314 may transmit light such that the upper measurement space 311 is observable from the outside. That is, the upper viewing window 314 may be referred to as a viewing mechanism for the isolated upper frame 310, and may include a material such as glass, quartz, fused silica, or sapphire.

The upper frame 310 may include a bellows cover to reduce or minimize vibration applied from the outside. For example, the upper frame 310 may have the bellows cover on the upper gate 312 through which the semiconductor substrate W is loaded and unloaded. The upper frame 310 may include the metallic or ceramic materials.

In example embodiments, the upper measuring portion 330 may be provided in the upper measurement space 311 of the upper frame 310. The upper measuring portion 330 may perform the measurement process on the semiconductor substrate W disposed on the upper substrate stage 320. The upper measuring portion 330 may perform the measurement process through precision control of nanometer level, that is, precise control at down to the nanometer range. Since the upper measuring portion 330 performs such high-precision control, the upper measuring portion 330 may be vulnerable to vibration from the outside.

The upper measuring portion 330 may be disposed on the upper substrate stage 320 by a plurality of upper supports 350. The plurality of upper supports 350 may be provided on the upper substrate stage 320 to support the upper measuring portion 330 so as to be spaced apart from the upper substrate stage 320. Alternatively, the plurality of upper supports 350 may be provided in various positions within the upper frame 310 to offset the vibration.

In example embodiments, the upper vibration damping portion 400 may offset (e.g., counteract) the second vibration V2 applied to the upper measuring device 300. The upper vibration damping portion 400 may offset the second vibration V2 applied to the upper frame 310 from the ground G through the plurality of support structures 500. The upper vibration damping portion 400 may offset the second vibration V2 applied to the upper measuring portion 330 from the upper frame 310.

The upper vibration damping portion 400 may include a plurality of second serial type dampers 410 and a plurality of second parallel type dampers 420. The second serial type dampers 410 and the second parallel type dampers 420 may offset a vibration in the horizontal direction (X direction) and a vibration in the vertical direction (Z direction) of the second vibration V2 applied to the upper measuring device 300.

The second serial type dampers 410 may be provided between the upper frame 310 and the plurality of support structures 500. The second serial type dampers 410 may be provided on the plurality of support structures 500, respectively. The second serial type dampers 410 may be provided on the base plate of the upper frame 310 and may extend toward the ground G. The second serial type dampers 410 may support the upper frame 310 on the base plate of the upper frame 310. For example, the second serial type dampers 410 may be provided in corner regions of the upper frame 310, respectively.

The second serial type dampers 410 may be fixed on or attached to the plurality of support structures 500, respectively, and the second serial type dampers 410 may oppositely move the upper frame 310 based on an error caused by the second vibration V2 to offset the second vibration V2. The second serial type dampers 410 may sense and offset the second vibration V2 in real time. That is, the second serial type dampers 410 may be configured to counteract or offset motion caused by the second vibration V2.

The second serial type dampers 410 may include second serial type vibration sensors 412 that are configured to detect a vibration in the vertical direction (Z direction) and a vibration in the horizontal direction (X direction) of the second vibration V2, and second serial type actuators 414 that are configured to offset the vibration in the vertical direction (Z direction) and the vibration in the horizontal direction (X direction) of the second vibration V2. The second serial type vibration sensors 412 may obtain vibration data of the second vibration V2 between the upper frame 310 and the plurality of support structures 500, respectively. The second serial type actuators 414 may actuate to level or horizontally maintain (i.e., maintain a horizontal orientation of) the base plate of the upper frame 310 based on the vibration data of the second vibration V2 to offset the second vibration V2.

The second parallel type dampers 420 may be provided in the upper measurement space 311 of the upper frame 310. The second parallel type dampers 420 may be provided between the upper frame 310 and the upper substrate stage 320. The second parallel type dampers 420 may be provided on the base plate of the upper frame 310 toward the upper substrate stage 320. The second parallel type dampers 420 may support the upper substrate stage 320 on the base plate of the upper frame 310. For example, the second parallel type dampers 420 may be provided at corner regions of the upper substrate stage 320, respectively.

The second parallel type dampers 420 may control a center of gravity of the upper measuring device 300 that is changed by the second vibration V2. The second parallel type dampers 420 may move the center of gravity of the upper measuring device 300 (e.g., oppositely) based on an error caused by the second vibration V2 to offset the second vibration V2. The second parallel type dampers 420 may sense and offset the second vibration V2 in real time. That is, the second parallel type dampers 420 may be configured to counteract or offset changes in the center of gravity caused by the second vibration V1.

The second parallel type dampers 420 may include second parallel type vibration sensors 422 that are configured to detect the vibration in the vertical direction (Z direction) and the vibration in the horizontal direction (X direction) of the second vibration V2, and second parallel type actuators 424 that are configured to offset the vibration in the vertical direction (Z direction) and the vibration in the horizontal direction (X direction) of the second vibration V2. The second parallel type vibration sensors 422 may obtain the vibration data of the second vibration V2 on the base plate of the upper frame 310, respectively. The second parallel type actuators 424 may actuate to horizontally maintain the upper substrate stage 320 based on the vibration of the second vibration V2 to offset the second vibration V2.

In example embodiments, the upper measuring device 300 may further include an upper plate 340 that is configured to support the upper frame 310. The upper plate 340 may more stably support the upper frame 310. The upper plate 340 may be provided between the second serial type dampers 410 and the upper frame 310.

The upper plate 340 may widen a disposition region on which the second serial type dampers 410 are provided. The second serial type dampers 410 may be provided on the upper plate 340, and may be provided outside of the base plate of the upper frame 310. Since the disposition region of the second serial type dampers 410 is widened through the upper plate 340, the second serial type dampers 410 may more stably support the upper frame 310.

In example embodiments, the measuring apparatus 10 may further include a transport device 600 that is configured to transport the semiconductor substrate W. The transport device 600 may be provided adjacent to the lower measuring device 100 and the upper measuring device 300. The transport device 600 may be provided adjacent to the lower frame 110 and the upper frame 310. The transport device 600 may include a stroke 610 that extends to be spaced apart from the upper measuring device 300 and the lower measuring device 100, and a transport arm 620 that is movable on the stroke 610.

The stroke 610 may extend to pass by the lower gate 112 and the upper gate 312. The stroke 610 may be provided adjacent to the lower gate 112 and the upper gate 312 such that the transport arm 620 transfers the semiconductor substrate W, in particular, the first semiconductor substrate and the second semiconductor substrate through the lower gate 112 and the upper gate 312, respectively.

The stroke 610 may include a plurality of cover structures 612 that are provided to be spaced apart from the lower gate 112 and the upper gate 312. The plurality of cover structures 612 may be provided on the lower gate 112 and the upper gate 312, respectively. The plurality of cover structures 612 may protect the semiconductor substrate W that is loaded and unloaded through the lower gate 112 or the upper gate 312 from the outside.

The plurality of cover structures 612 may include the bellows cover. The plurality of cover structures 612 may absorb shocks that are generated from collisions with the lower gate 112 and the upper gate 312 using an elastic force, and may reduce or prevent the vibration occurring in the lower measuring device 100 and the upper measuring device 300.

The transport arm 620 may hold and fix the semiconductor substrate W that is provided by an operator. The transport arm 620 may transfer the semiconductor substrate W within a range that does not collide with the upper measuring device 300 and the lower measuring device 100. The transport arm 620 may load or unload the semiconductor substrate W (e.g., the first semiconductor substrate W) into the lower measurement space 111 of the lower measuring device 100. The transport arm 620 may load or unload the semiconductor substrate W (e.g., the second semiconductor substrate W) into the upper measurement space 311 of the upper measuring device 300.

In example embodiments, the measuring apparatus 10 may further include a work structure 700 that provides a movement route along which the operator moves. The work structure 700 may be provided adjacent to the lower measuring device 100 and the upper measuring device 300.

The work structure 700 may include stairs 710 and handrails 720. The work structure 700 may provide the movement route to the operator such that the operator manages the upper measuring device 300 provided on the lower measuring device 100.

The operator may move to an upper floor through the stairs 710. The upper floor may be provided at a height from the ground G at which the operator is able to manage the upper measuring device 300. The handrails 720 may prevent the operator from falling from the upper floor.

The operator may access to locations adjacent to the lower viewing window 114 of the lower frame 110 and the upper viewing window 314 of the upper frame 310 through the work structure 700. The operator on the work structure 700 may check and supervise the measurement process through the lower viewing window 114 and the upper viewing window 314.

As described above, the lower vibration damping portion 200 may offset or at least partially counteract the first vibration V1 generated from the ground G to the lower measuring portion 130. The upper vibration damping portion 400 may offset or at least partially counteract the second vibration V2 generated from the ground G to the upper measuring portion 330. Since the lower and upper vibration damping portions 200 and 400 may independently offset the first and second vibrations V1 and V2, respectively, the lower and upper vibration damping portions 200 and 400 may not affect each other in a process of damping the first and second vibrations V1 and V2, respectively.

Further, unlike the lower frame 110, the upper frame 310 may be disposed on the ground G through the plurality of support structures 500. That is, the support structures 500 may couple the upper frame 310 to the ground G independent of the coupling between the lower frame 110 and the ground G. The plurality of support structures 500 may support the upper frame 310 to be spaced apart from the lower frame 110. Because the lower and upper frames 110 and 310 are disposed to be spaced apart from each other in a vertical direction, vibrations may not be transmitted between the upper frame 310 and the lower frame 110, and accordingly, the lower vibration damping portion 200 and the upper vibration damping portion 400 may independently offset the first and second vibrations V1 and V2.

The measuring apparatus 10 may improve space utilization through the plurality of support structures 500, and accuracy of the measurement process may be improved through the upper and lower vibration damping portions 200 and 400 that independently control the first and second vibrations V1 and V2.

Figure 3:
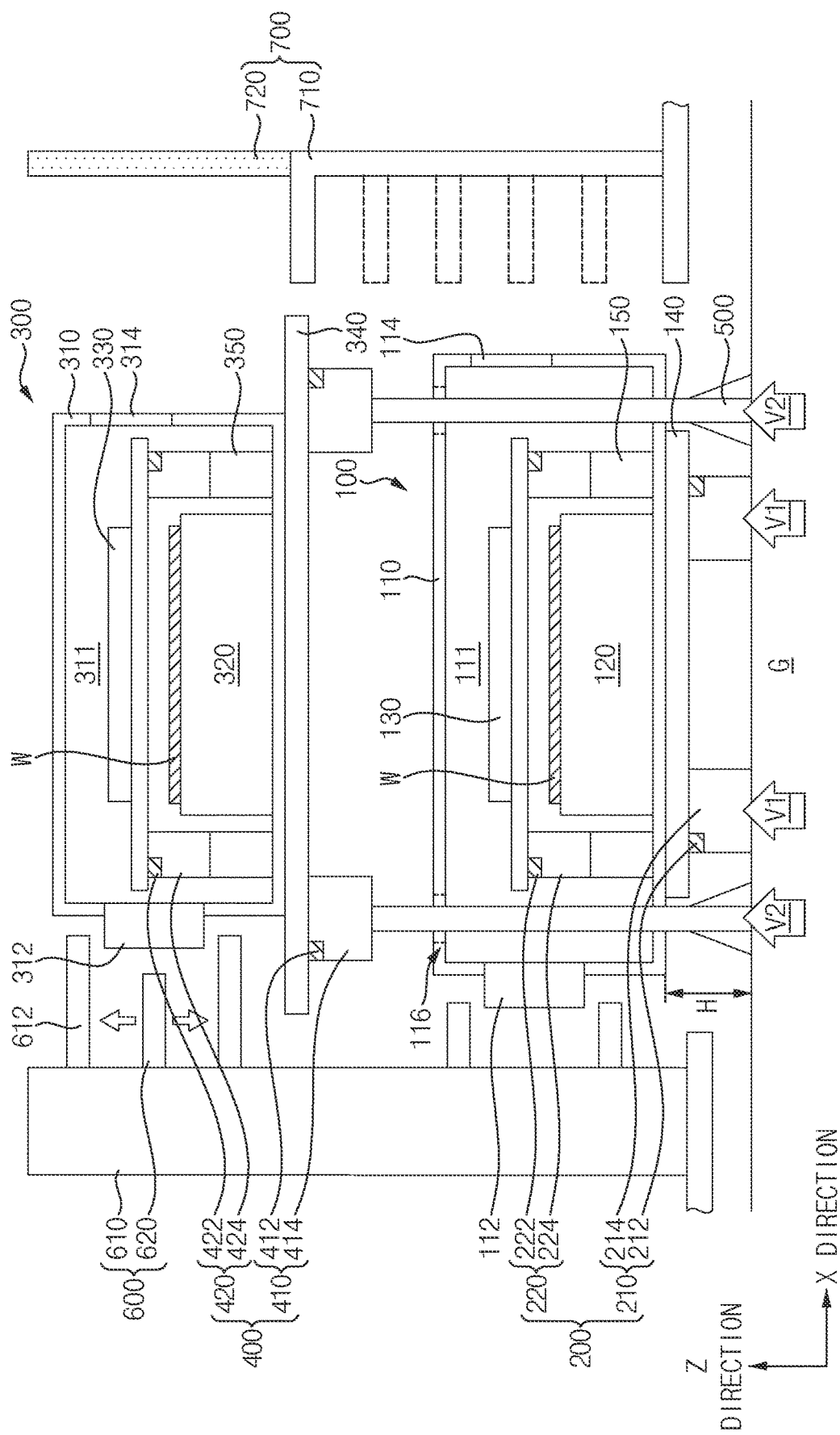

FIG. 3 is a view illustrating a measuring apparatus for a semiconductor device having a modified structure in accordance with example embodiments. The measuring apparatus may be substantially the same as or similar to the measuring apparatus described with reference to FIGS. 1 and 2 except for a configuration of the upper and lower measuring devices. Thus, same or similar components are denoted by the same or similar reference numerals, and repeated descriptions of the same components will be omitted.

Referring to FIG. 3, a measuring apparatus 12 for a semiconductor device may include a lower measuring device 100 configured to perform a first measurement process on a first semiconductor substrate W, an upper measuring device 300 provided to be spaced apart from the lower measuring device 100 to perform a second measurement process on a second semiconductor substrate W, and a plurality of support structures 500 configured to support the upper measuring device 300 so as to be spaced apart from the lower measuring device 100.

The lower measuring device 100 may include a lower frame 110 that provides a lower measurement space 111 for performing the measurement process, a lower substrate stage 120 provided in the lower frame 110 to support the semiconductor substrate W, the lower measuring portion 130 configured to measure the semiconductor substrate W disposed on the lower substrate stage 120, and a lower vibration damping portion 200 configured to offset a first vibration V1 of the lower measuring portion 130 with respect to the ground G.

The lower frame 110 may include a plurality of through openings 116 through which the plurality of support structures 500 is provided. The plurality of support structures 500 may support the upper measuring device 300 to be spaced apart from the lower frame 110 through the through openings 116. Since the lower frame 110 has the plurality of through openings 116, a structure of the lower frame 110 may be expanded. Since the structure of the lower frame 110 is expanded, an operator may more easily access the lower gate 112 and a lower viewing window 114.

An inner wall of each of the through openings 116 may be spaced apart from an outer surface of each of the support structures 500. Since the through openings 116 and the support structures 500 do not directly contact, the first vibration V1 applied to the lower measuring device 100 may be blocked or prevented from being transmitted to the support structures 500. Since the through openings 116 and the support structures 500 do not directly contact, the lower vibration damping portion 200 and the upper vibration damping portion 400 may independently offset the first and second vibrations V1 and V2. Also, in the measuring apparatus 12 of FIG. 3, the first parallel dampers 220 may be provided between the lower supports 150 and the lower measuring portion 130 so as to support the lower measuring portion 130 independent of the lower substrate stage 120. Similarly, in the measuring apparatus 12 of FIG. 3, the second parallel dampers 420 may be provided between the upper supports 350 and the upper measuring portion 330 so as to support the upper measuring portion 330 independent of the upper substrate stage 320.

Hereinafter, a method of measuring a semiconductor device using the measuring apparatus in FIG. 1 will be described.

FIG. 4 is a flowchart illustrating a method of measuring a semiconductor device in accordance with example embodiments.

Referring to FIGS. 1, 2 and 4, a first semiconductor substrate W may be provided on a lower substrate stage 120 that is provided in a lower measuring device 100 for performing a measurement process (e.g., a first measurement process) on the semiconductor substrate W (S110).

In example embodiments, the measurement process may be performed on the semiconductor substrate W in the lower measuring device 100. The lower measuring device 100 may be provided on or coupled to a ground G in a semiconductor manufacturing facility for manufacturing the semiconductor device.

The semiconductor substrate W may be gripped and fixed by a transport arm 620 of a transport device 600, and may be loaded onto a lower substrate stage 120 through the transport arm 620.

A first vibration V1 may be applied to the lower measuring device 100 from the ground G. The first vibration V1 may be transmitted to the lower measuring portion 130 that is configured to measure the semiconductor substrate W (including one or more characteristics thereof), and to the lower substrate stage 120 that is configured to support the semiconductor substrate W.

A second semiconductor substrate W may be provided on an upper substrate stage 320 that is provided in an upper measuring device 300 to be spaced apart from the lower measuring device 100 (S120).

In example embodiments, the measurement process (e.g., a second measurement process) may be performed on the semiconductor substrate W in the upper measuring device 300. The upper measuring device 300 may be provided on a plurality of support structures 500 that are provided on or coupled to the ground G in the semiconductor manufacturing facility.

The semiconductor substrate W may be gripped and fixed by the transport arm 620 of the transport device 600, and may be loaded onto the upper substrate stage 320 through the transport arm 620.

A second vibration V2 may be applied to the upper measuring device 300 through the plurality of support structures 500. The second vibration V2 may be transferred to the upper measuring portion 330 that is configured to measure the semiconductor substrate W (including one or more characteristics thereof), and to the upper substrate stage 320 that is configured to support the semiconductor substrate W.

The first vibration V1 applied to the lower measuring device 100 and the second vibration V2 applied to the upper measuring device 300 may be damped through vibration damping devices 200 and 400, respectively. (S130).

In example embodiments, the first vibration V1 may be damped through the lower vibration damping portion 200 installed between the lower measuring device 100 and the ground G. The second vibration V2 may be damped through the upper vibration damping portion 400 installed between the upper measuring device 300 and the plurality of support structures 500. The first and second vibrations V1 and V2 may be damped (e.g., independently) through the lower and upper vibration damping portions 200 and 400, respectively.

Since the lower measuring device 100 and the upper measuring device 300 do not directly contact each other, the lower measuring device 100 and the upper measuring device 300 may not exchange the first and second vibrations V1 and V2 with each other. That is, the lower measuring device 100 and the upper measuring device 300 may be vibrationally isolated from one another. Since the lower and upper vibration damping portions 200 and 400 independently offset the first and second vibrations V1 and V2, respectively, the lower and upper vibration damping portions 200 and 400 may more effectively offset the first and second vibrations V1 and V2.

The semiconductor substrates W disposed on the upper and lower substrate stages 320 and 120 may be measured in a state in which the first and second vibrations V1 and V2 are damped, respectively (S140).

In example embodiments, since the first and second vibrations V1 and V2 are independently damped through the lower and upper vibration damping portions 200 and 400, vibrations generated in the semiconductor substrates W that are disposed on the upper and lower substrate stages 320 and 120 may be blocked. Vibrations occurring in the lower measuring portion 130 and the upper measuring portion 330 may be blocked. Since the measuring apparatus 10, 12 is configured to offset the first and second vibrations V1 and V2 independently of each other, the measuring apparatus 10 may reduce or minimize the vibration and may improve measurement efficiency.

The foregoing is illustrative of example embodiments and is not to be construed as limiting thereof. Although a few example embodiments have been described, those skilled in the art will readily appreciate that many modifications are possible in example embodiments without materially departing from the teachings and advantages of the present invention. Accordingly, all such modifications are intended to be included within the scope of example embodiments as defined in the claims.

What is claimed is:

1. A measuring apparatus for a semiconductor device, comprising:
   a lower frame that provides a lower measurement space configured for performing a first measurement process on a first semiconductor substrate;
   a lower measuring portion in the lower frame and configured to measure a characteristic of the first semiconductor substrate on a lower substrate stage;
   a lower vibration damping portion configured to offset a first vibration of the lower measuring portion with respect to a ground;
   an upper frame that provides an upper measurement space configured for performing a second measurement process on a second semiconductor substrate;
   an upper measuring portion in the upper frame and configured to measure a characteristic of the second semiconductor substrate on an upper substrate stage;
   an upper vibration damping portion configured to offset a second vibration of the upper measuring portion with respect to the ground; and
   a plurality of support structures that support the upper frame such that the upper frame is spaced apart from the lower frame.

2. The measuring apparatus of claim 1, wherein the lower vibration damping portion comprises:
   a plurality of first serial type dampers under the lower frame; and
   a plurality of first parallel type dampers in the lower frame and configured to support the lower measuring portion, and
   wherein the upper vibration damping portion comprises:
   a plurality of second serial type dampers between the upper frame and the plurality of support structures; and
   a plurality of second parallel type dampers in the upper frame and configured to support the upper measuring portion.

3. The measuring apparatus of claim 2, wherein the first and second serial type dampers and the first and second parallel type dampers comprise:
   a plurality of vibration sensors configured to obtain vibration data from one of the first and second vibrations, respectively; and
   a plurality of actuators configured to offset the one of the first and second vibrations based on the vibration data, respectively.

4. The measuring apparatus of claim 3, wherein the lower frame is spaced apart from the ground by a predetermined height through the plurality of first serial type dampers, and the predetermined height is within a range of about 0.7 meters (m) to about 1 m.

5. The measuring apparatus of claim 3, further comprising:
   a lower plate between the plurality of first serial type dampers and the lower frame, wherein the lower plate supports the lower frame; and
   an upper plate between the plurality of second serial type dampers and the upper frame, wherein the upper plate supports the upper frame.

6. The measuring apparatus of claim 1, wherein the lower and upper frames comprise lower and upper gates configured to load or to unload the first and second semiconductor substrates into or from the lower and upper measurement spaces, respectively.

7. The measuring apparatus of claim 6, further comprising:
   a transport device spaced apart from the lower and upper frames,
   wherein the transport device comprises:
   a stroke extending along the lower and upper gates; and
   a transport arm that is movable on the stroke, the transport arm being configured to load or to unload the first and second semiconductor substrates into or from the lower and upper measurement spaces, respectively.

8. The measuring apparatus of claim 7, wherein the transport device further comprises a bellows cover configured to damp vibration transmitted to the lower and upper frames.

9. The measuring apparatus of claim 1, further comprising:
   a working structure spaced apart from the lower frame and the upper frame, the working structure providing a movement route around the upper frame.

10. The measuring apparatus of claim 1, wherein the lower frame further comprises a plurality of through openings through which the plurality of support structures extend, respectively, and
    wherein an outer surface of each of the plurality of support structures is spaced apart from an inner wall of each of the plurality of through openings.

11. A measuring apparatus for a semiconductor device, comprising:
    a lower measuring device including a lower frame that provides a lower measurement space configured for performing a first measurement process on a first semiconductor substrate, a lower measuring portion in the lower frame and configured to measure a characteristic of the first semiconductor substrate on a lower substrate stage, and a lower vibration damping portion configured to offset a first vibration of the lower measuring portion with respect to a ground;
    an upper measuring device including an upper frame that provides an upper measurement space configured for performing a second measurement process on a second semiconductor substrate, an upper measuring portion in the upper frame and configured to measure a characteristic of the second semiconductor substrate on an upper substrate stage, and an upper vibration damping portion configured to offset a second vibration of the upper measuring portion with respect to the ground; and
    a plurality of support structures that support the upper measuring device such that the upper measuring device is spaced apart from the lower measuring device.

12. The measuring apparatus of claim 11, wherein the lower vibration damping portion comprises:
    a plurality of first serial type dampers under the lower frame; and a plurality of first parallel type dampers in the lower frame and configured to support the lower measuring portion, and the upper vibration damping portion comprises:

a plurality of second serial type dampers between the upper frame and the plurality of support structures; and a plurality of second parallel type dampers in the upper frame and configured to support the upper measuring portion.

13. The measuring apparatus of claim 12, wherein the first and second serial type dampers and the first and second parallel type dampers comprise:

a plurality of vibration sensors configured to obtain vibration data from one of the first and second vibrations, respectively; and plurality of actuators configured to offset the one of the first and second vibrations based on the vibration data, respectively.

14. The measuring apparatus of claim 13, wherein the lower measuring device further comprises a lower plate that is between the plurality of first serial type dampers and the lower frame, wherein the lower plate supports the lower frame, and the upper measuring device further comprises an upper plate that is between the plurality of second serial type dampers and the upper frame, wherein the upper plate supports the upper frame.

15. The measuring apparatus of claim 11, wherein the lower and upper frames comprise lower and upper gates configured to load or to unload the first and second semiconductor substrates into or from the lower and upper measurement spaces, respectively.

16. The measuring apparatus of claim 15, further comprising:

a transport device spaced apart from the lower and upper frames, wherein the transport device comprises:

a stroke extending along the lower and upper gates; and a transport arm that is movable on the stroke, the transport arm being configured to load or to unload the first and second semiconductor substrates into or from the lower and upper measurement spaces, respectively.

17. The measuring apparatus of claim 16, wherein the transport device further comprises a bellows cover configured to damp vibration transmitted to the lower and upper frames.

18. The measuring apparatus of claim 11, further comprising:

a working structure spaced apart from the lower frame and the upper frame, the working structure providing a movement route around the upper frame.

19. The measuring apparatus of claim 11, wherein the lower frame further comprises a plurality of through openings through which the plurality of support structures extend, respectively, and wherein an outer surface of each of the plurality of support structures is spaced apart from an inner wall of each of the plurality of through openings.

20. A measuring apparatus for a semiconductor device, comprising:

a lower frame that provides a lower measurement space;

a lower measuring portion in the lower frame and configured to measure a characteristic of a first semiconductor substrate on a lower substrate stage;

a lower vibration damping portion configured to offset a first vibration of the lower measuring portion with respect to a ground;

an upper frame that provides an upper measurement space;

an upper measuring portion in the upper frame and configured to measure a characteristic of a second semiconductor substrate on an upper substrate stage;

an upper vibration damping portion configured to offset a second vibration of the upper measuring portion with respect to the ground; and a plurality of support structures that support the upper frame such that the upper frame is spaced apart from the lower frame, wherein the lower frame further comprises a plurality of through openings through which the plurality of support structures extend, respectively, and wherein an outer surface of each of the plurality of support structures is spaced apart from an inner wall of each of the plurality of through openings.

* * * * *